C. E. KELLS.
WATER DISTILLING APPARATUS.
APPLICATION FILED JULY 26, 1919.
1,366,465.
Patented Jan. 25, 1921.
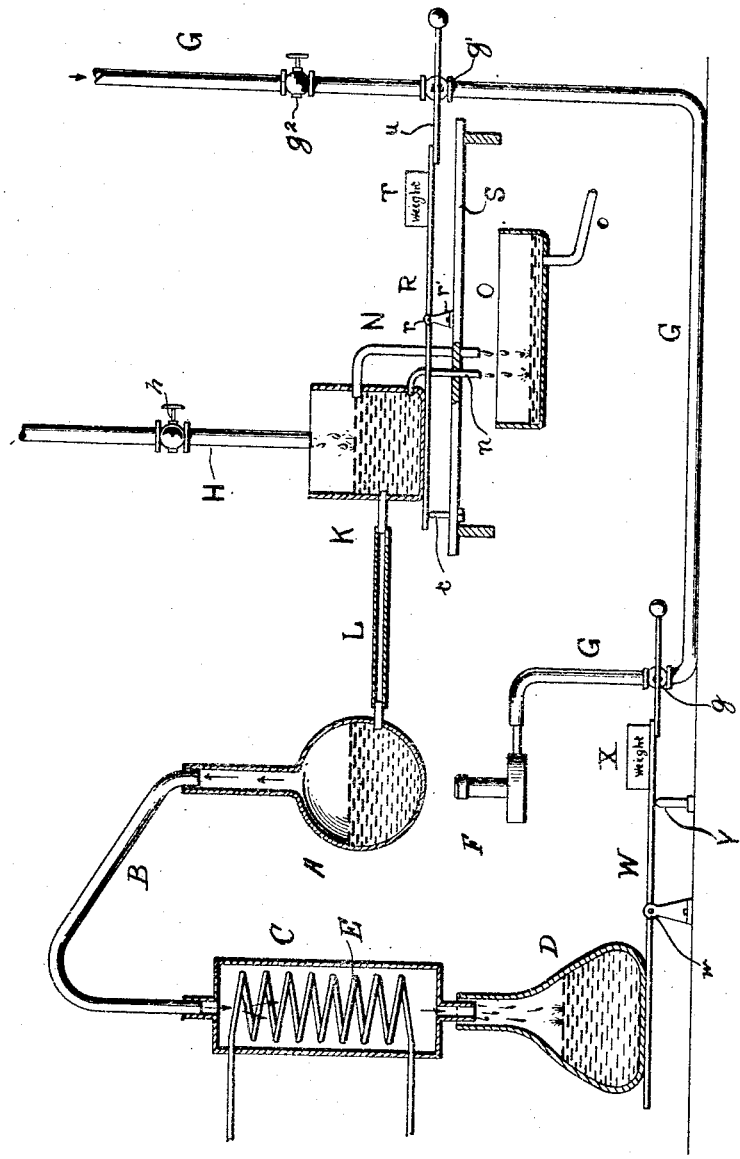
Witnesses
Inventor
C. Edmund Kells
By His Attorneys

UNITED STATES PATENT OFFICE.

CHARLES EDMUND KELLS, OF NEW ORLEANS, LOUISIANA.

WATER-DISTILLING APPARATUS.

1,366,465.  Specification of Letters Patent.  Patented Jan. 25, 1921.

Application filed July 26, 1919. Serial No. 313,481.

*To all whom it may concern:*

Be it known that I, CHARLES EDMUND KELLS, a citizen of the United States, residing at New Orleans, in the parish of Orleans and State of Louisiana, have invented certain new and useful Improvements in Water-Distilling Apparatus, of which the following is a specification.

This invention relates to apparatus for distilling water, particularly for the use of physicians, surgeons and dentists who generally require small quantities of freshly distilled water from day to day or for constant use.

It is important that water for such purposes should be distilled in apparatus consisting entirely or mainly of glass in preference to metal, as the distilled water is often used for injections and absolute purity is essential. Stills of this kind, as commonly constructed, require constant watching in order that the water supply shall not fail, because otherwise the glass flask or still will be cracked, burned or broken by the heat of the burner.

According to my invention I provide a distilling apparatus constructed mainly of glass and which is automatic in the control of the water supply and the heating medium, so that the proper amount of water is constantly provided for normally keeping the water in the flask or still at the proper level and the proper amount of heating medium admitted to the burner to carry on the operation, and which is so constructed also that should the water supply fail or become insufficient the heating medium will be at once and automatically cut off so that breakage of any part of the apparatus due to over-heating is prevented.

The drawing shows diagrammatically, and mainly in section, a distilling apparatus embodying my improvements.

A glass flask or still A is connected by a glass pipe B to a condenser C, also made of glass. The condenser delivers to a suitable receptacle D below it, and the condenser contains a pipe E through which a cooling medium circulates. All parts of the apparatus with which the distilled water comes in contact are preferably made of glass, and the condenser, still, and other parts of the apparatus heretofore described, are supported on suitable brackets or standards.

The burner F is suitably supported beneath the flask A and is supplied by pipe G provided with a valve $g$ and also with a similar valve at $g'$. The valves $g$, $g'$ are automatically operated in the manner hereinafter described. A third valve $g^2$ is also carried by the pipe G which is hand-operated for the purpose of shutting off the fuel supply when the apparatus is out of operation.

Water is supplied to the apparatus through a service pipe H which may be connected with a city water supply system or to a tank and this pipe is equipped with a valve $h$ by means of which the supply may be turned on or off as required to the desired extent. The pipe H delivers to a tank K which is connected by a pipe L to the flask or still A. The pipe L is flexible or has flexible parts so that the tank can move up and down when required. The tank is provided with an overflow pipe N delivering to a receiver O, having a discharge pipe $o$. The tank is also provided with a very small drain pipe $n$ which delivers to said receiver O. By this means the tank may be emptied when the water supply is shut off. The overflow pipe N is so connected with the tank K that the water therein is normally maintained at the same level as the water in the flask A, and the valve $h$ should be so adjusted as to maintain this level.

Owing, however, to irregularities in the water pressure and other causes, the operation of maintaining the constant water level cannot be relied on implicitly and hence I have provided means for automatically cutting off the heating medium should the water level fall to an unsafe extent and when the receiver D is filled to the desired extent. The tank K is supported on a platform R, pivoted at $r$ to a standard $r'$, supported on a platform or bracket S. On one side of the pivot or fulcrum the platform carries a weight T which is sufficient to overbalance the tank when the water level falls. $t$ indicates a stop for limiting the downward movement of the platform on that side which carries the tank. Said platform R on the opposite side of the pivot connects with an arm $u$ of a weighted valve $g'$. The arrangement is such that when the water level is properly maintained in the tank K the parts will occupy the position shown in the drawings, but should the water supply fail and the water level fall to too great an extent, or fall below the level of the pipe L, then the weighted end of the platform will so operate on the valve $g'$ as to close the fuel supply. In this way the supply of fuel is automatically cut off and the operation stopped should the water in the flask or still A, fall to an unsafe extent.

In like manner provision is made for cutting off the fuel supply when the receiver is filled to the desired amount. The receiver D is supported on a platform W pivoted at $w$ to a suitable standard. The platform is weighted at X and the downward movement of the weighted end of the platform is limited by a stop Y. The weighted end of the platform connects with the weighted valve $g$, and the operation is such that normally the valve is open and fuel is supplied to the burner, but when the receiver is filled the weighted end of the platform W will operate on the valve $g$ to close it and shut off the supply of fuel.

In starting the operation, the valve $h$ is opened and the tank K filled until it overflows through the pipe N. After this, the valve $h$ is partially closed and left open only to such extent as to let water descend drop by drop to the tank. The valves $g, g'$ are properly set to admit fuel, and the valve $g^2$ is opened and the burner is lighted. The water in the still is allowed to boil for a few minutes to generate steam which passes through the condenser and escapes into the receptacle D. This is for the purpose of sterilizing the apparatus. The receptacle D, however, has already been sterilized. The cooling medium is then allowed to circulate, very slowly at first, through the condensing coil, and the valve $h$ is so set as to keep the water level constant in the tank K and by means of the connections described the water level in the flask or still A will be kept at the same level irrespective of how slowly or how rapidly the water boils away. In this way the water level in the flask is automatically maintained and danger of breakage is prevented.

When the receptacle D for the distilled water becomes filled it overcomes the force of the weight X and the platform is tilted and the gas supply shut off so that the operation automatically comes to an end.

The supply of water through the pipe H is normally in excess of the water boiled away in the flask, the surplus overflowing through the pipe N. Should the water supply to the pipe H fail, the apparatus will be automatically operated to stop the fuel supply to the burner in the manner before described.

I claim as my invention:

1. A distilling apparatus, comprising a still for the water, a burner for heating the still, means for suppyling fuel to the burner, means for condensing the products of distillation, a supply tank for the still, and means operated by the decrease in weight of water in said tank for shutting off the fuel supply when the water level in the tank falls below a safe level.

2. Apparatus for distilling water, comprising a still, a burner for heating it, means for supplying fuel to the burner, means for condensing the products of distillation, a balanced tank connected with the still for supplying it with water, means for maintaining the water in the still at the same level as the water in the tank, and means operated by the weight of the tank and contents for controlling the supply of heating medium to the burner.

3. A distilling apparatus, comprising a still, a burner for heating the still, a fuel supply pipe for feeding the burner, a tank connected with the still, means for maintaining the water in the still and in the tank at the same level, counterbalancing devices for the tank and a valve connected with said counterbalancing devices which is closed to cut off the fuel supply when the water level in the tank falls below a safe level.

4. Apparatus for distilling water, comprising a still, a burner for heating it, means for condensing the products of distillation, a receiver for the distilled water, a weighted platform on which said receiver is supported, and means operated by said weighted platform for turning off the fuel supply when said receiver is filled to a predetermined extent.

5. A distilling apparatus comprising a flask having an opening in its upper portion for the exit of products of distillation and an opening in its lower portion for the entrance of liquid to be distilled, a tank for supplying the flask with liquid, means for condensing the products of distillation, and means located outside the tank and operated by the weight of water in the tank for automatically maintaining a constant liquid level in said tank.

6. A distilling apparatus, comprising a still, a burner for heating the still, means for supplying fuel to the burner, means for condensing the products of distillation, a tank for containing water, a flexible connection between the tank and the lower portion of the still, means for supplying water to the tank, a balanced platform on which the tank is supported, a valve in the fuel supply, and means operated by the platform for shutting off the fuel supply.

7. A distilling apparatus, comprising a still, a burner for heating the still, a pipe for supplying fuel to the burner, means for condensing the products of distillation, means for supplying water to the still, a receiver for the condensed fluid, a counterbalanced platform on which the receiver is supported, a valve in the fuel supply pipe, and means operated by the platform for closing the valve when the receiver is filled.

8. A distilling apparatus comprising a still, a burner for heating the still, means for supplying fuel to the burner, means for condensing the products of distillation, a receiver for the condensed fluid, and means located outside the receiver and controlled by the weight of liquid in the receiver for regulating the supply of fuel.

9. A distilling apparatus, comprising a still, a burner for heating the still, means for supplying fuel to the burner, means for condensing the products of distillation, a receiver for the condensed fluid, a support for the receiver, means for balancing the support, and means connected with the support for cutting off the fuel supply when the liquid in the receiver reaches a predetermined height or weight.

In testimony whereof I have hereunto subscribed my name.

CHARLES EDMUND KELLS.